US011813992B2

(12) United States Patent
Huelsen et al.

(10) Patent No.: US 11,813,992 B2
(45) Date of Patent: Nov. 14, 2023

(54) ROOF MODULE FOR FORMING A VEHICLE ROOF COMPRISING A SUPPORT MODULE

(71) Applicant: Webasto SE, Stockdorf (DE)

(72) Inventors: Michael Huelsen, Stockdorf (DE);
Cédric Langlais, Stockdorf (DE);
Michael Mailhamer, Stockdorf (DE);
Juraj Lehotsky, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 0 days.

(21) Appl. No.: 17/633,054

(22) PCT Filed: Aug. 12, 2020

(86) PCT No.: PCT/EP2020/072598
§ 371 (c)(1),
(2) Date: Feb. 4, 2022

(87) PCT Pub. No.: WO2021/032559
PCT Pub. Date: Feb. 25, 2021

(65) Prior Publication Data
US 2022/0266763 A1  Aug. 25, 2022

(30) Foreign Application Priority Data
Aug. 19, 2019  (DE) ............. 10 2019 122 197.8

(51) Int. Cl.
*B60R 11/04* (2006.01)
*B62D 25/06* (2006.01)
*G01S 13/931* (2020.01)
*G01S 17/931* (2020.01)
(Continued)

(52) U.S. Cl.
CPC .............. *B60R 11/04* (2013.01); *B62D 25/06* (2013.01); *G01S 13/931* (2013.01);
(Continued)

(58) Field of Classification Search
CPC ......... B60R 11/04; B62D 25/06; G01S 7/027; G01S 7/4813; G01S 13/931; G01S 17/931; G01S 2013/9327
(Continued)

(56) References Cited

U.S. PATENT DOCUMENTS 9,885,526 B2 * 2/2018 Maranville ............. F25B 21/02
11,467,284 B2 * 10/2022 Yamamoto ........... B60Q 1/0023
(Continued)

FOREIGN PATENT DOCUMENTS

DE   10 2016 123 752 A1   7/2017
DE   10 2017 104 988 A1   9/2017
(Continued)

OTHER PUBLICATIONS

International Search Report for PCT/EP2020/072598 dated Nov. 5, 2020, in English and German (7 pages).
(Continued)

*Primary Examiner* — Dennis H Pedder
(74) *Attorney, Agent, or Firm* — Fitch, Even, Tabin & Flannery, LLP

(57) ABSTRACT

A roof module for forming a vehicle roof on a motor vehicle, the roof module having a panel component whose outer surface at least partially forms the roof skin of the vehicle roof, the roof module having at least one environment sensor configured to send and/or receive electromagnetic signals for detecting the vehicle surroundings. The environment sensor can be disposed below the roof skin formed by the panel component, the roof module having at least one support module, and at least two environment sensors being jointly mounted on the support module.

14 Claims, 5 Drawing Sheets

(51) Int. Cl.
    *G01S 7/02*         (2006.01)
    *B60R 11/00*      (2006.01)
    *G01S 7/481*      (2006.01)

(52) U.S. Cl.
    CPC ....... *G01S 17/931* (2020.01); *B60R 2011/004* (2013.01); *G01S 7/027* (2021.05); *G01S 7/4813* (2013.01)

(58) Field of Classification Search
    USPC ................ 296/210, 215, 193.04, 193.12
    See application file for complete search history.

(56) References Cited

U.S. PATENT DOCUMENTS

| | | |
|---|---|---|
| 2005/0151396 A1 | 7/2005 | Berberich et al. |
| 2017/0190300 A1 | 7/2017 | Maranville et al. |
| 2017/0261273 A1 | 9/2017 | Maranville et al. |
| 2018/0037267 A1 | 2/2018 | Williams et al. |
| 2019/0003895 A1 | 1/2019 | Krishnan et al. |
| 2019/0202371 A1 | 7/2019 | Frederick et al. |
| 2019/0210436 A1 | 7/2019 | Frederick et al. |
| 2020/0301012 A1 | 9/2020 | Yamamoto et al. |

FOREIGN PATENT DOCUMENTS

| | | |
|---|---|---|
| EP | 3 514487 A1 | 7/2019 |
| JP | 2012-232679 A | 11/2012 |
| WO | 031093061 A1 | 11/2003 |

OTHER PUBLICATIONS

Translation of International Search Report and Written Opinion for PCT/EP2020/072598 dated Feb. 17, 2022, in English (8 pages).

\* cited by examiner

ROOF MODULE FOR FORMING A VEHICLE ROOF COMPRISING A SUPPORT MODULE

CROSS-REFERENCE TO RELATED APPLICATION

This application is a U.S. national phase application filed under 35 U.S.C. § 371 of International Application No. PCT/EP2020/072598, filed Aug. 12, 2020, designating the United States, which claims priority from German Patent Application Number 10 2019 122 197.8, filed on Aug. 19, 2019, which is hereby incorporated herein by reference in its entirety for all purposes.

FIELD

The invention relates to a roof module for forming a vehicle roof on a motor vehicle according to the preamble of claim 1.

BACKGROUND

Generic roof modules are widely used in vehicle manufacturing since these roof modules can be prefabricated as functional modules and can be delivered to the assembly line when assembling the vehicle. The roof module can be either a part of a rigid vehicle roof or a part of an openable roof sub-assembly.

Autonomously or semi-autonomously driving motor vehicles are increasingly common in vehicle manufacturing. A plurality of environment sensors detecting the surroundings of the motor vehicle and determining the current traffic situation are required in order to enable the vehicle controller to control the motor vehicle autonomously or semi-autonomously or in a manner supporting a driver. To this end, the known environment sensors send and/or receive corresponding electromagnetic signals, such as laser beams or radar beams, a corresponding signal evaluation allowing a data model of the vehicle surroundings to be generated.

The known environment sensors are installed in an appropriate sensor housing in order to protect the environment sensors from harmful environmental conditions, such as humidity and airflows. This sensor housing is mounted on top of the vehicle roof in order to afford the environment sensor a highest possible monitoring position. Mounting the environment sensor together with a sensor housing on top of the vehicle roof is disadvantageous in that it negatively affects both the aerodynamic properties and the design of the vehicle. Moreover, mounting the sensor housing on top of the vehicle roof requires very high precision in order to ensure the functionality of the environment sensors in detecting the vehicle surroundings. Hence, high-precision fixing of the sensor housing on top of the vehicle roof is time-consuming and cost-intensive.

SUMMARY

Hence, the object of the invention is to propose a new roof module which avoids the disadvantages of the state of the art described above.

This object is attained by a roof module according to the teaching of claim 1.

Advantageous embodiments of the invention are the subject matter of the dependent claims.

The environment sensor of the roof module according to the invention is installed below the roof skin. A support module serves to attach the environment sensor to the roof module below the roof skin. Pre-installing the environment sensor on the support module easily ensures an exact positioning of the environment sensor. Moreover, the installation of the environment sensors in the roof module is significantly simplified since the support module with the environment sensor pre-installed thereon simply has to be mounted in the roof module. This makes an individual adjustment of the environment sensor in the roof module unnecessary. Instead, the support module merely needs to be exactly aligned in the roof module. In case of malfunction, the entire support module with the environment sensor mounted thereon can simply be detached and replaced, if required.

Preferably, multiple environment sensors can be jointly mounted on the support module. By jointly mounting the environment sensors on the support module, the environment sensors can be pre-installed on the support module in defined positions.

It is particularly advantageous for the fastening elements for fastening the support module in the roof module to be equipped with adjusters in order to simplify the positioning of the support module relative to the roof module and therefore relative to the vehicle body when installing the support module. An adjuster of this kind can be formed in the support module in the manner of oblong holes, for example. The adjuster allows the support module to be exactly aligned once pre-fixed and to be subsequently fixed in the roof module by operating the fastening elements. This is an enormous advantage in particular when replacing support modules.

Exhaust heat, which might compromise the function of the environment sensors, can occur during the operation of known environment sensors. Likewise, deep temperatures, such as in the case of ice and snow, can compromise the function of the environment sensors. Hence, it is particularly advantageous if a heater and/or cooler is installed on the support module in addition to the environment sensors in order to ensure the function of the environment sensors in all temperature ranges. This heater and/or cooler can be used to implement thermal management in order to keep the operating temperature of the environment sensors in an admissible temperature range.

Basically any type of heating elements or cooling elements can be installed on the roof module. Particularly simple architectures result if a cooling fan and/or an air cooling element are provided for cooling the environment sensors and for discharging the exhaust heat emitted by the environment sensors via the support module.

Alternatively or additionally, the heater and/or cooler can also comprise a liquid element or a liquid cooling element.

The operation of vehicles, in particular autonomously operated vehicles, often requires radio communication in order to exchange information with vehicles running ahead or vehicles following behind, for example. Radio communication is also necessary for transmitting radio signals or position signals. This type of radio communication by sending and receiving radio signals requires antenna modules to be installed in the vehicle. The antennas have to be positioned on the vehicle in such a manner that other parts of the vehicle do not obscure the radio signals. Since the environment sensors in the roof module are typically disposed at the highest point of the vehicle, this location is particularly suitable for additionally accommodating an antenna module. Hence, according to a preferred embodiment, an antenna module is installed on the support module in addition to the environment sensors. This antenna module can be used to establish radio communication with transmitters and receivers outside of the vehicle and with transmitters and receivers within the vehicle.

There are often regulations for operating motor vehicles in an autonomous operating mode, in which the vehicle is not controlled by a driver but by the vehicle controller, which prescribe that said operating mode be signaled by a signaling element (ADS light). It is particularly advantageous for this signaling element to be installed on the support module for mounting the environment sensors in order to save costs. In this manner, separate installation means for installing the signaling element on the vehicle become unnecessary.

The different components, in particular the environment sensors, the heater and/or cooler, the antenna module and/or the signaling element, can be fastened to the support module in basically any manner. It is advantageous for the support module to comprise multiple fastening mounts in order to ensure an exact relative positioning of the different components on the support module. In this case, an environment sensor, the heater and/or cooler, an antenna module and/or a signaling element can be pre-installed in the respective fastening mounts in a defined position relative to each other. In other words, this means that all functional elements to be fastened to the support module are each pre-installed in the intended fastening mounts.

There are different options for attaching the support module to the vehicle. A particularly cost-efficient and simple solution is attaching the support module with the environment sensors pre-installed thereon to a frame element or a body shell element or a panel component forming the roof skin of the vehicle. The necessary mechanical stability is easily obtained in this way. Moreover, exhaust heat can be discharged from the support module via these components, which are typically made of metal, in order to thus improve the thermal management accordingly.

According to a preferred embodiment, the support module is disposed in a dry section of the roof module, which is protected from humidity, with a view to an ideal protection of the functional elements, in particular the environment sensors, attached to the support module.

If the support module is disposed in a dry section, the occurring exhaust heat cannot be easily discharged directly from the dry section since a cooling fan, for example, cannot be operated in the dry section. The roof module can additionally comprise a heat conducting element to solve this problem. This heat conducting element can be used to discharge heat from the support module and to transfer it into an area where the exhaust heat can be easily dissipated.

Basically any type of heat conducting element can be used for the heat conduction. A particularly simple and cost-efficient solution consists in configuring the heat conducting element in the manner of a metal sheet part.

In particular, support plates which serve to attach the roof module to the vehicle body, for example, can simultaneously be used as the heat conducting element for discharging heat.

If two environment sensors with an optical functioning principle are attached to the support module, an entry of stray light into these environment sensors must be avoided. A simple way to do so is for the support module to comprise a stray light shade which prevents stray light from entering the environment sensors.

Basically any type of environment sensors can be attached to the support module. The support module offers particularly large advantages for environment sensors which are configured in the manner of a lidar sensor and/or in the manner of a radar sensor and/or in the manner of a camera sensor and/or in the manner of a multi-camera sensor.

The roof module according to the invention can basically be employed both in passenger cars and in utility vehicles, such as delivery vans or tractor units for heavy goods vehicles. It can be configured as a purely solid roof or can be provided with a roof opening system and thus form a closable roof opening.

Furthermore, the roof module according to the invention preferably forms a structural unit which comprises integrated features enabling autonomous driving or semi-autonomous driving supported by driver assistance systems and which can be placed on top of a vehicle body shell by a vehicle manufacturer.

The invention also relates to a motor vehicle comprising a roof module of the kind described above.

Different embodiments of the invention are schematically illustrated in the drawings and will be discussed in more detail as examples below.

BRIEF DESCRIPTIONS OF THE DRAWINGS

DETAILED DESCRIPTION

Figure 1:
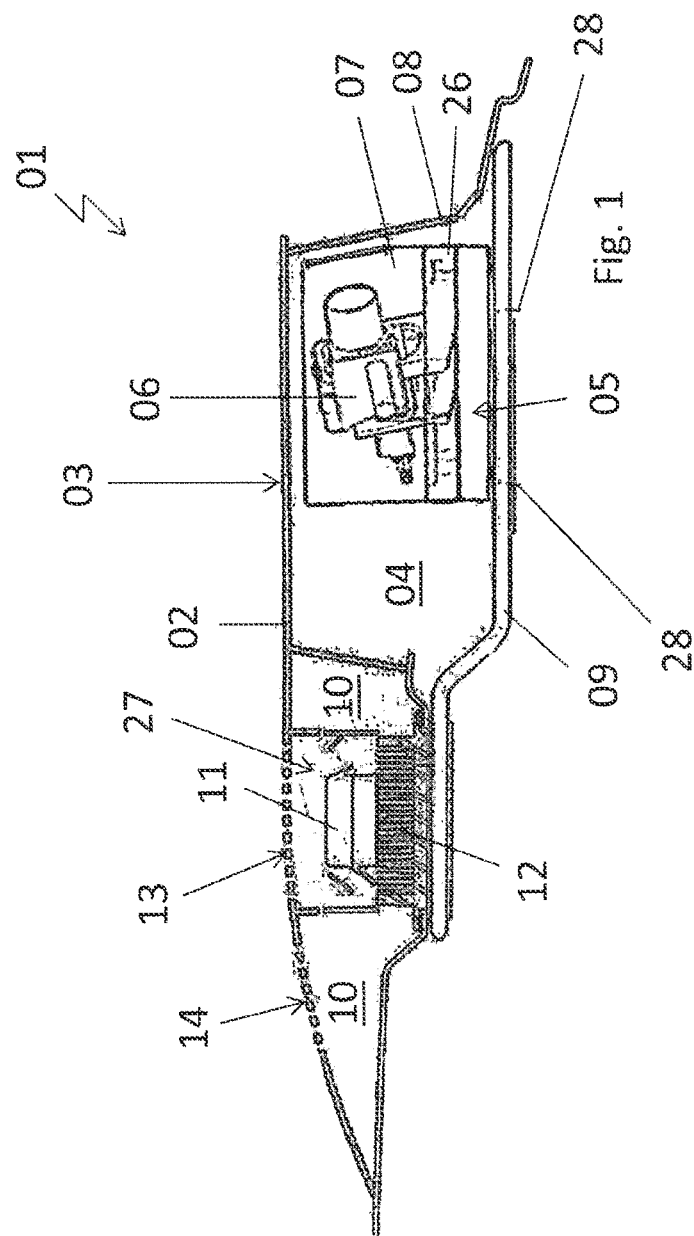
FIG. 1 is a schematic longitudinal section of a roof module comprising a support module for mounting multiple environment sensors.

FIG. 1 shows a roof module 01 for being installed on the vehicle roof of a motor vehicle in order to enable an autonomous or semi-autonomous operation of the motor vehicle. Roof module 01 comprises a panel component 02 whose outer side forms a part of roof skin 03 of the vehicle. A dry section 04 in which a support module 05 is installed is formed within roof module 01. Two lateral environment sensors 06 and a middle environment sensor 07 are pre-installed on support module 05. A cooling element 26 is located below middle environment sensor 07. Cooling element 26 comprises a liquid cooling element which absorbs and discharges heat generated by environment sensors 06. A cover 08, which is made of plastic, for example, is located on roof module 01 in the area in front of environment sensors 06, cover 08 being permeable to the electromagnetic radiation, such as laser beams or radar beams, emitted by environment sensors 06.

Support module 05 is mounted on a support plate 09 by means of fastening screws 28, support plate 09 being part of the mechanical structure of roof module 01. In this way, support plate 09 serves to mechanically fix support module 05. Also, in support plate 09, exhaust heat absorbed by cooling element 26 can be discharged from dry section 04 to a cooler 27 in a wet area 10. So support plate 09 also serves as a heat conducting element in this manner. If the heat conducting capacity of support plate 09 is insufficient, a heat pipe can be additionally provided on support plate 09. Cooler 27 is located in wet area 10 and comprises a cooling fan 11 which interacts with a cooling element 12 to discharge the exhaust heat. Cooling fan 11 can aspirate fresh air through openings 13. The fresh air is then heated when it flows across cooling element 12 and is expelled through openings 14.

Figure 2:
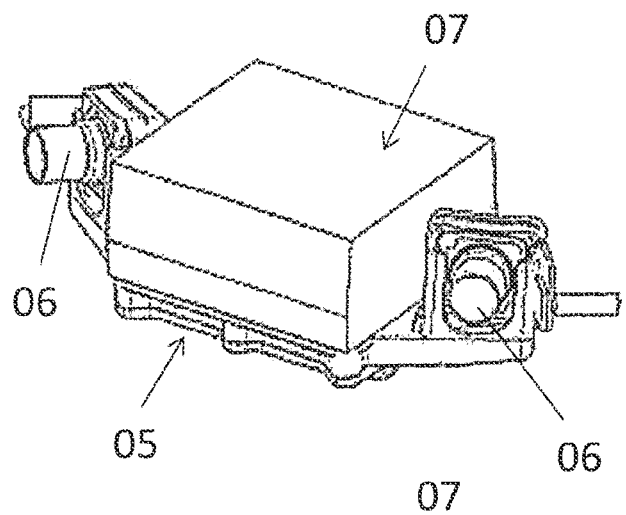
FIG. 2 is a perspective lateral view of the support module of the roof module of FIG. 1.

FIG. 2 shows a perspective view of support module 05 with the two environment sensors 06 and environment sensors 07 disposed between them. The pre-installation of environment sensors 06 and 07 leads to an exact positioning in particular of environment sensors 06 and 07 relative to each other. Moreover, the entire support module 05 can be replaced very quickly and easily in case of a malfunction of environment sensors 06 and 07.

Figure 3:
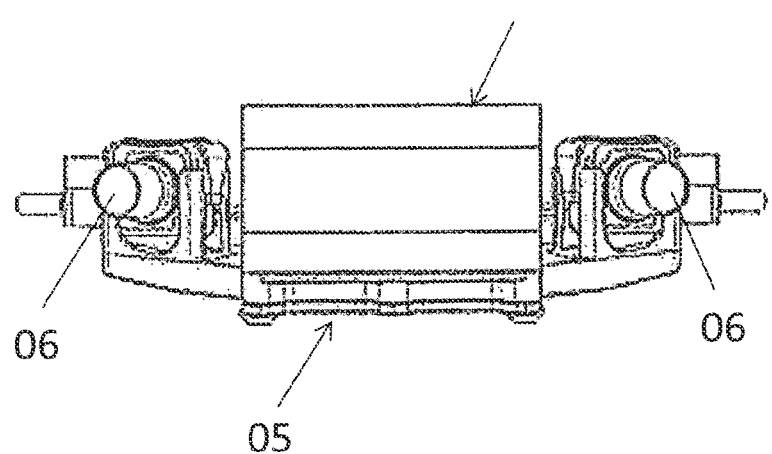
FIG. 3 is a front view of the support module of FIG. 2.
Figure 4:
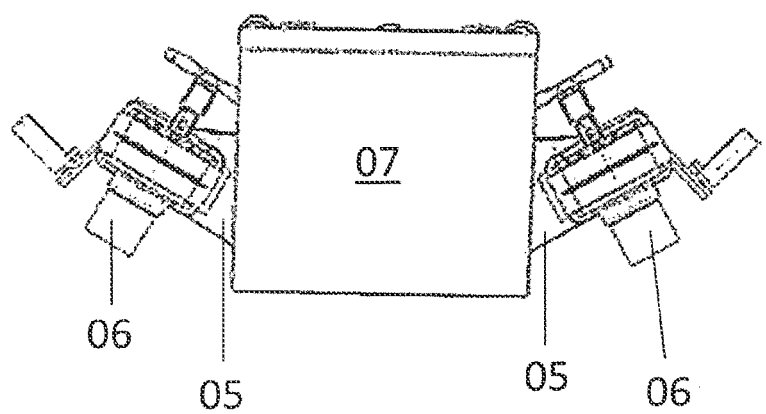
FIG. 4 is a top view of the support module of FIG. 2.

FIG. 3 and FIG. 4 show a front view and a top view, respectively, of support module 05 and the two environment sensors 06 and 07.

Figure 5:
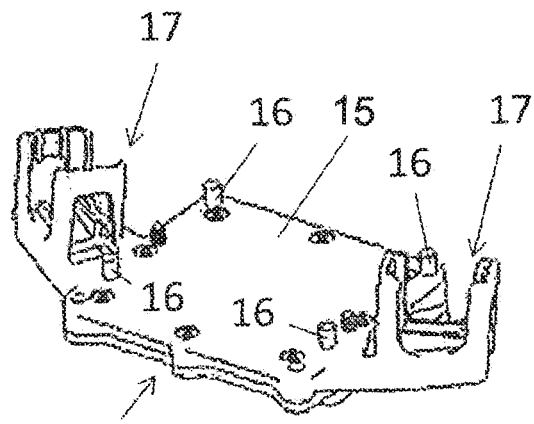
FIG. 5 is a perspective lateral view of the support module of FIG. 2 after all functional elements have been detached.
Figure 6:
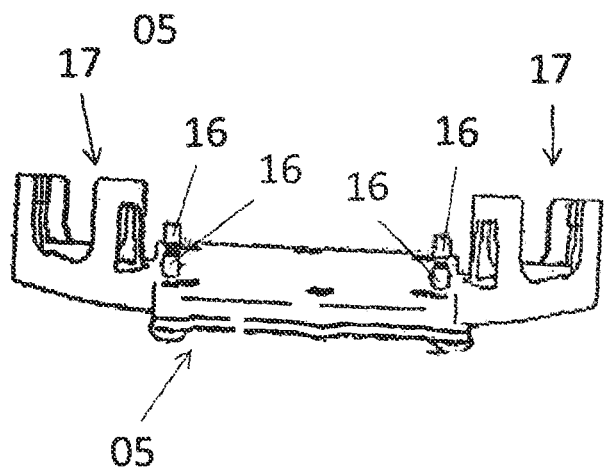
FIG. 6 is a front view of the support module of FIG. 5.
Figure 7:
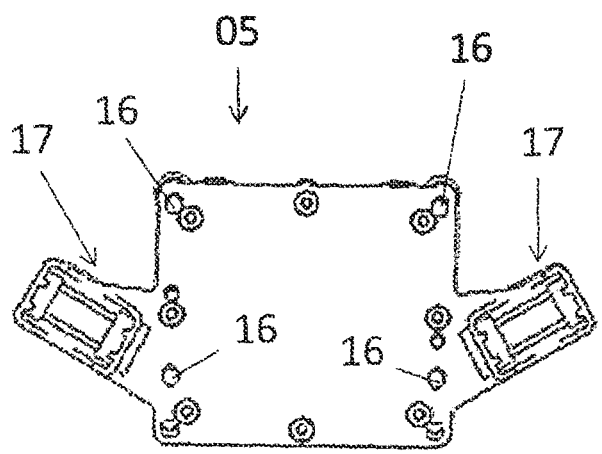
FIG. 7 is a top view of the support module of FIG. 5.

FIG. 5 to FIG. 6 show a perspective view, a side view and a top view of support module 05. All functional elements, i.e., the three environment sensors 06 and 07, are detached. Environment sensor 07 is installed on the upper side of a base plate 15, which comprises cooling element 26, Adjusting bolts 16, which ensure a precise positioning of environment sensor 07 on base plate 15, are provided on the upper side of base plate 15. Two fastening mounts 17, in each of which an environment sensor 06 can be preinstalled in an exact position, are provided on both sides of base plate 15.

Figure 8:
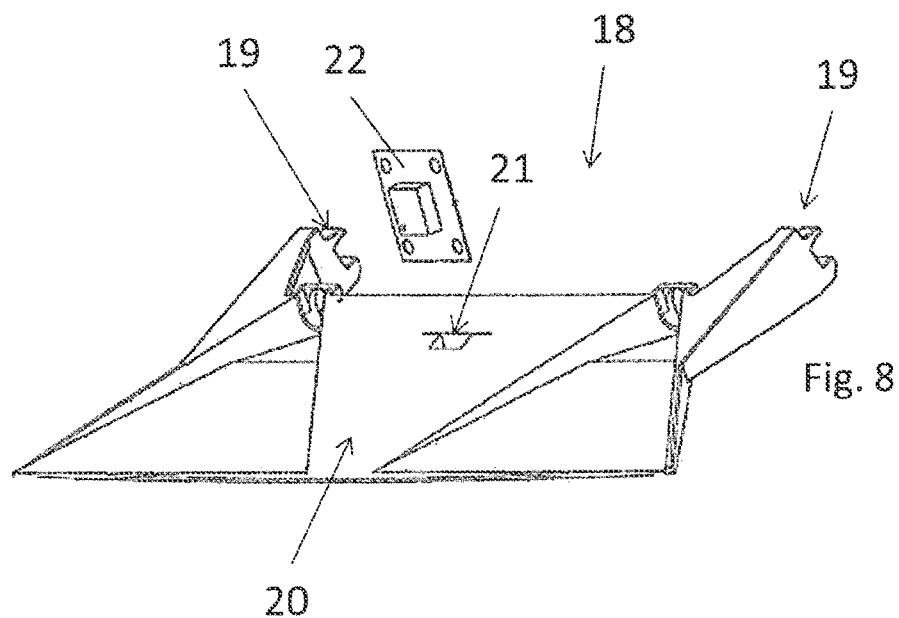
FIG. 8 is a perspective lateral view of a second embodiment of a support module for fixing multiple functional elements.
Figure 9:
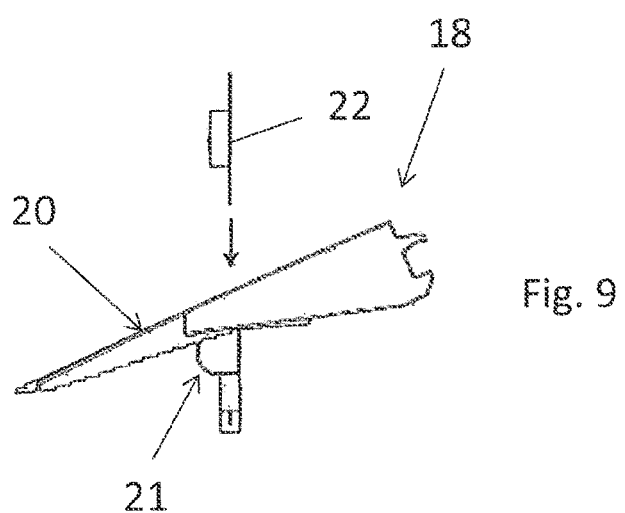
FIG. 9 is a lateral view of the support module of FIG. 8.
Figure 10:
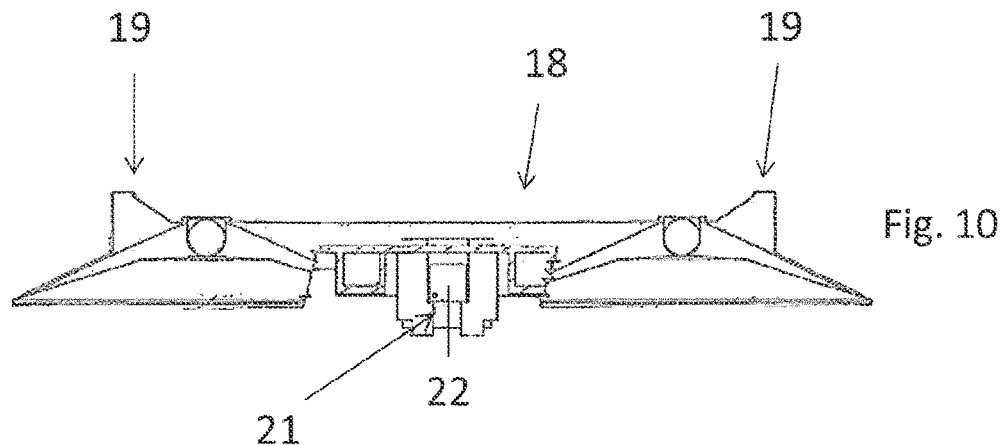
FIG. 10 is a front view of the support module of FIG. 8.

FIG. 8 to FIG. 10 show a second embodiment of a support module 18, which is also provided for being installed in a roof module. Support module 18 comprises two fastening mounts 19, on each of which an environment sensor can be installed in a precise relative positioning. A stray light shade 20 is provided between the two fastening mounts 19. An antenna module 22 can be fixed in a fastening mount 21 on top of stray light shade 20.

FIG. 9 shows the insertion of the antenna module 22 into fastening mount 21 from above.

FIG. 10 shows support module 18 with antenna module 22 attached thereto in fastening mount 21. Support module 18 is illustrated in a partial section, part of stray light shade 20 being omitted.

Figure 11:
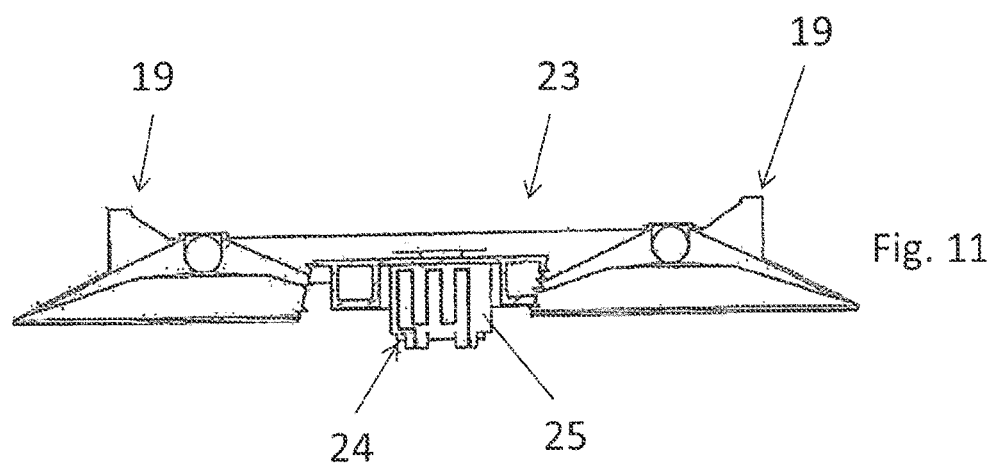
FIG. 11 shows a third embodiment of a support module for mounting multiple functional elements.

FIG. 11 shows another embodiment of a support module 23. Support module 23 largely corresponds to support module 18. It differs from support module 18 in that an antenna module 24 is printed onto a receiving surface 25 in the area below stray light shade 20, which means that there is no fastening mount 21.

The invention claimed is:

1. A roof module for forming a vehicle roof on a motor vehicle, the roof module comprising:
a panel component whose outer surface at least partially forms the roof skin of the vehicle roof,
the roof module comprising at least one environment sensor configured to send and/or receive electromagnetic signals for detecting the vehicle surroundings,
wherein the environment sensor is disposed below the roof skin formed by the panel component, the roof module comprising at least one support module,
at least one environment sensor being mounted on the support module,
wherein the roof module forms a structural unit which comprises integrated features enabling autonomous driving or semi-autonomous driving and which can be placed on top of a vehicle body shell,
wherein the roof module comprises a frame element and at least two environment sensors being mounted on the support module,
wherein the support module is attached to the frame element, and
wherein the support module comprises a base plate provided with fastening mounts for the environment sensors.

2. The roof module according to claim 1, wherein the support module has at least one fastening element configured to fasten the support module to the roof module, the fastening element having an adjuster configured to adjust the relative position of the support module on the roof module.

3. The roof module according to claim 1, wherein at least a part of a heater and/or cooler is attached to the support module.

4. The roof module according to claim 3, wherein the heater and/or cooler comprises a cooling fan and/or at least one cooling body.

5. The roof module according to claim 3, wherein the heater and/or cooler comprises a liquid heating body or a liquid cooling body.

6. The roof module according to claim 1, wherein an antenna module is additionally mounted on the support module.

7. The roof module according to claim 1, wherein the support module comprises multiple fastening mounts configured for pre-installing the environment sensors and/or the heater and/or cooler and/or the antenna module and/or the signaling element thereon in a defined position relative to each other.

8. The roof module according to claim 1, wherein the support module with the pre-installed environment sensors is configured to be attached to the frame element forming the roof skin of a vehicle or to a support plate.

9. The roof module according to claim 1, wherein the support module is disposed in a dry section of the roof module, the dry section being protected from humidity.

10. The roof module according to claim 1, wherein the roof module comprises a heat conducting element, the heat conducting element being configured to discharge heat from the support module.

11. The roof module according to claim 10, wherein the heat conducting element is configured in the manner of a metal sheet part.

12. The roof module according to claim 11, wherein the metal plate part serving as the heat conducting element is configured in the manner of a support sheet.

13. The roof module according to claim 1, wherein the support module comprises a stray light shade between the two environment sensors.

14. The roof module according to claim 1, wherein the environment sensor is configured in the manner of a lidar sensor and/or in the manner of a radar sensor and/or in the manner of a camera sensor and/or in the manner of a multi-camera sensor.

* * * * *